United States Patent Office 3,133,027
Patented May 12, 1964

3,133,027
METHOD FOR PROCESSING ZINC-CADMIUM SULFIDE ELECTROLUMINESCENT PHOSPHOR
Willi Lehmann, Livingston, N.J., assignor to Westinghouse Electric Corporation, East Pittsburgh, Pa., a corporation of Pennsylvania
No Drawing. Filed Jan. 15, 1962, Ser. No. 166,355
24 Claims. (Cl. 252—301.6)

This invention relates to electroluminescence and, more particularly, to electroluminescent phosphor having improved performance characteristics and a method for making such phosphor.

The best-known electroluminescent phosphors have a zinc-sulfide matrix. Incorporated into this matrix is a small amount of impurity activator material, such as copper. Usually a small amount of impurity coactivator material, such as chlorine, bromine, iodine or a suitable "three-plus" valent metal is required for good electroluminescent characteristics, in order to compensate the charges within the phosphor. In explanation, the copper activator has a "one-plus" valence and in order to balance the charges within the phosphor, it is necessary to add thereto a coactivator, as indicated. Such a phosphor is referred to in the art as "charge compensated."

To date, the best copper-activated, zinc-sulfide electroluminescent phosphors normally have a cubic crystalline structure. Apparently a cubic structure permits cuprous sulfide inclusions to be introduced into the phosphor crystal, and it is believed that these are required for good electroluminescence. Hexagonal phosphor particles, in contrast to cubic particles, appear to have a well defined crystal structure and contain almost no visible lattice faults, thereby apparently precluding or at least inhibiting the incorporation of the cuprous sulfide segregations into the phosphor crystal.

It is known that the introduction of cadmium sulfide into zinc sulfide phosphor causes a shift of the emission toward the longer wavelengths, with little or no effect on the efficiency of photo- or cathodo-luminescence. In the case of electroluminescent phosphors, however, if appreciable proportions of cadmium sulfide are included in the phosphor matrix, the electroluminescent performance of the phosphor is deleteriously affected.

Sulfide- and selenide-type electroluminescent phosphors have been modified in order to have an emission in the longer wavelength regions of the visible spectrum, but such modified phosphors are normally limited in their use because of relatively low brightness, toxicity, or difficulty of preparation.

It is the general object of this invention to provide a method for enhancing the electroluminescent performance of copper-activated, zinc-cadmium sulfide phosphors which have a hexagonal or cubic crystalline structure.

It is another object to provide a method for changing the crystalline structure of copper-activated zinc-cadmium sulfide electroluminescent phosphor from hexagonal to cubic, while simultaneously greatly enhancing the electroluminescent performance of such phosphor.

It is an additional object to provide method details for preparing copper-activated, zinc-cadmium sulfide electroluminescent phosphor which has a strong emission in the longer wavelength regions of the visible spectrum.

The aforesaid objects of the invention, and other objects which will become apparent as the description proceeds, are achieved by baking copper-activated, zinc-cadmium sulfide phosphor in an iodine vapor atmosphere. After baking, the phosphor preferably is immediately removed from contact with iodine vapor. Depending on the phosphor formulation and the temperature of the iodine vapor in which the phosphor is baked, different effects can be obtained, as follows:

(1) If the phosphor initially has a hexagonal structure and does not have an excessive cadmium sulfide concentration, the iodine-vapor bake can cause the phosphor crystalline structure to shift from hexagonal to cubic, with additional enhancement of the electroluminescent output.

(2) If the phosphor initially has a hexagonal crystalline structure and a relatively high cadmium sulfide concentration, the iodine bake will not shift the crystalline structure, but the electroluminescent output will nevertheless be enhanced.

(3) If the phosphor initially has a cubic crystalline structure, the iodine vapor bake will cause the particles to increase in size.

In the case the crystalline structure of the iodine-vapor-baked phosphor is cubic, the phosphor desirably is further heated in an iodine-vapor-free atmosphere. There is also provided a charge-compensated, copper-activated, zinc-cadmium sulfide electroluminescent phosphor which has a cubic crystalline structure and a strong long wavelength electroluminescent output.

IODINE VAPOR BAKE OF HEXAGONAL ZnCdS:Cu PHOSPHOR

Generally considering the high-temperature, iodine-vapor bake of a hexagonal zinc-cadmium sulfide electroluminescent phosphor, reference is made to copending application S.N. 166,357, filed concurrently herewith, titled "Hexagonal Zinc-Cadmium Sulfide Electroluminescent Phosphor and Method" by Lehmann, the inventor herein, and owned by the present assignee. This copending application relates to a copper-activated, iodine-coactivated matrix having a hexagonal crystalline structure. The phosphor matrix is cadmium sulfide or zinc-cadmium sulfide, with the relative molar proportions of cadmium sulfide to zinc sulfide being at least 30:70, and this copending application can be referred to for details with respect to initially preparing a specific zinc-cadmium sulfide phosphor which can be further processed in accordance with the present invention. The iodine bake of the present invention is also applicable to any charge-compensated, copper-activated, zinc-cadmium sulfide or cadmium sulfide matrix of substantially hexagonal crystalline structure, where the relative molar proportions of CdS to ZnS are at least about 8:92. The phosphor can be coactivated by bromine, chlorine, iodine, aluminum, gallium, scandium, indium, or mixtures thereof, for example, and any of these hexagonal phosphors can be improved by processing in accordance with the present invention.

In the following Table I is indicated the effect of iodine vapor baking on the electroluminescent performance of hexagonal zinc-cadmium sulfide, wherein the zinc sulfide to cadmium sulfide molar ratio is 60:40. These phosphors all had a hexagonal crystalline structure before iodine-vapor baking and, because of the relatively large percentage of cadmium sulfide, they retained the hexagonal crystalline structure after the high-temperature, iodine-vapor bake. In conducting the tests, the phosphor samples were initially prepared and then separated into two fractions designated "A" and "B." The fraction designated "B" was baked in an atmosphere consisting essentially of iodine vapor at a temperature of 550° C. for a period of 1 hour. The resulting relative electroluminescent brightnesses for the iodine-baked fractions were increased by factors of from 6.9 to 33, as follows:

regions of the visible spectrum and even in the near infrared. Such longer wavelength emissions are extremely

Table I

| Phosphor lot | No. 1 | | No. 2 | | No. 3 | | No. 4 | | No. 5 | |
|---|---|---|---|---|---|---|---|---|---|---|
| Composition (in mole percent): | | | | | | | | | | |
| ZnS | 60 | | 60 | | 60 | | 60 | | 60. | |
| CdS | 40 | | 40 | | 40 | | 40 | | 40. | |
| Cu | 1.0 | | 1.0 | | 1.0 | | 1.0 | | 1.0. | |
| Cl | 0.3 | | | | | | | | | |
| Br | | | 0.3 | | | | | | | |
| I | | | | | 0.3 | | | | | |
| Al | | | | | | | 0.2 | | | |
| Ga | | | | | | | | | 0.2 | |
| Initial firing temp. (° C.) | 800 | | 800 | | 800 | | 1,100 | | 1,100. | |
| Emission color | Orange-red | | Orange-red | | Orange | | Yellow | | Deep red. | |
| Fraction | A | B | A | B | A | B | A | B | A | B |
| I₂-baked | No | Yes | No | Yes | No | Yes | No | Yes | No | Yes |
| Relative brightness of E.L. | 0.16 | 3.3 | 0.13 | 2.5 | 0.063 | 1.99 | 0.26 | 2.3 | 0.016 | 0.11 |
| Ratio of improvement | 21 | | 19 | | 33 | | 8.8 | | 6.9 | |

In preparing the phosphor lots as shown in Table I, copper was added to the raw mix as $Cu(C_2H_3O_2)_2 \cdot H_2O$, chlorine was added as zinc chloride, bromine was added as zinc bromide, iodine was added as zinc iodide, aluminum was added as finely divided metal powder, and gallium was added as gallium nitrate. In the case of the "three-plus" valent metal coactivators, these materials can be added either as a finely divided metal powder or as a compound. If desired, the volatile halogen coactivators can be introduced as a gas into the firing atmosphere. An equivalent amount of indium, added as the nitrate, can be used to coactivate the phosphor.

The effect of the high-temperature, iodine-vapor bake is not completely understood. In copending application S.N. 151,453, filed November 10, 1961, titled "Electroluminescent Phosphor and Method of Processing," by Lehmann, the inventor herein, and owned by the present assignee, is disclosed a method for improving the electroluminescent performance of copper-activated, zinc-sulfide phosphor wherein the phosphor is exposed to low-temperature iodine vapor, i.e., up to a temperature of 200° C., in order to convert the cuprous sulfide to substantially colorless copper iodide. When the phosphor is baked in iodine vapor at a temperature somewhat in excess of about 200° C., the cuprous iodide apparently diffuses into the crystal lattice of the phosphor, leaving the particle surfaces free of copper. As a result, the emission color of electroluminescence is shifted toward the longer wavelengths, but the electroluminescence is greatly impaired.

At a baking temperature beginning at about 500° C., the iodine vapor directly attacks the zinc-cadmium sulfide lattice and, unexpectedly, this reaction apparently occurs with little or no reaction with the cuprous sulfide segregations on and within the phosphor crystals. It is interesting to note that zinc iodide and cadmium iodide have appreciable vapor pressures at these baking temperatures, but the mechanism by which the iodine reacts with the zinc-cadmium sulfide lattice is not clearly understood. At any rate, at a baking temperature of about 500° C., the phosphor particles begin to grow in size. Simultaneously, the cuprous sulfide is no longer converted to colorless copper iodide, as it was at lower temperatures, but remains as black cuprous sulfide, which is clearly visible. In addition, the emission color of the phosphor is again shifted toward the shorter wavelengths in which the phosphor originally emitted, that is, before being baked in iodine vapor at intermediate temperatures such as 200° C. to 400° C. This high-temperature, iodine-vapor bake increases the electroluminescent quantum efficiency of the hexagonal phosphors by at least 2 to 3 times, and usually by a much greater factor. If the resulting phosphors remain hexagonal, they normally still do not possess the quantum efficiency of a good cubic, zinc sulfide electroluminescent phosphor. It should be noted, however, that the emissions of the present zinc-cadmium sulfide phosphors can be governed to peak in the longer wavelength difficult to obtain with the usual copper-activated, zinc-sulfide electroluminescent phosphor.

The temperature of the iodine vapor in which the phosphor is baked can vary from 500° C. to 900° C. and the phosphor should be baked in this atmosphere for a period of at least five minutes, with the lower the baking temperature within the foregoing range, the longer the baking time. The upper baking temperature limitation is governed primarily by the fact that at higher temperatures the phosphor particles grow very rapidly, and extremely large particles are difficult to handle when fabricating an electroluminescent device. There does not appear to be any real limitation to the maximum baking time, however, and for a baking temperature of 500° C., the phosphor can be baked for a greatly extended period, such as 48 hours. Preferably the phosphor is baked in the iodine vapor at a temperature of from 550° C. to 650° C. for a period of at least twenty minutes.

After baking, the phosphor desirably is immediately removed from contact with the hot iodine vapor. This can be accomplished by rapidly cooling the baking container or, alternatively, by removing the cap from the firing tube and allowing residual excess iodine to rapidly disperse.

After baking and cooling, the phosphor is desirably washed in a solution which is a good solvent for cuprous sulfide, but which is not a good solvent for zinc and cadmium sulfides. As an example, the phosphor is washed in a sodium cyanide solution made alkaline by the addition of a small amount of sodium hydroxide and such washing procedures are well known for copper-activated, zinc sulfide electroluminescent phosphors. Other similar known solvents can be substituted for the cyanide, such as a thiosulfate or thiourea solution.

As a further specific example for carrying out the present invention, approximately 100 grams of the hexagonal phosphor are mixed with one gram of purified elemental iodine and placed into a capped silica tube which is surrounded by a static nitrogen atmosphere. The phosphor is fired at a temperature of 550° C. for one hour, with the static nitrogen atmosphere surrounding the firing tube. After firing, the phosphor desirably is cooled rapidly by force cooling. Alternatively, the phosphor is immediately removed from contact with hot iodine vapor by uncapping the silica tube and flushing the firing container with nitrogen. This is to prevent the phosphor from contacting iodine vapor on cooling through a temperature of from 200° C. to 400° C. Thereafter the phosphor is completely cooled, gently crushed, and washed in the cyanide solution as specified hereinbefore.

CONVERSION OF HEXAGONAL ZnCdS:Cu PHOSPHOR TO A CUBIC STRUCTURE BY IODINE VAPOR BAKE

If the molar ratio of zinc sulfide to cadmium sulfide in the hexagonal phosphor material is from about 92:8 to about 80:20, and preferably from about 92:8 to about 85:15 and the phosphor is coactivated by bromine, chlorine, iodine, aluminum, gallium, scandium, or mixtures thereof, for example, the crystalline structure of the phosphor can be changed by the present iodine-vapor bake from hexagonal to cubic, with still further improved electroluminescence performance, in addition to obtaining a phosphor which has an excellent output in the longer wavelength regions of the visible spectrum. The zinc sulfide to cadmium sulfide molar ratio in the phosphor should be greater than about 92:8 if a longer wavelength emission is to be obtained. It is preferred to use the non-volatile coactivators such as aluminum, gallium, and scandium, since the volatile halogen coactivators are somewhat difficult to control during the high-temperature, iodine-vapor bake, and results may vary somewhat from phosphor batch to phosphor batch. The preferred coactivator is gallium since this material is easily handled, it readily assimilated into the phosphor matrix, and is not as readily oxidized as aluminum and scandium. To convert the crystalline structure of the phosphor from hexagonal to cubic, the iodine vapor bake should be conducted at a temperature of from 500° C. to 750° C. for a period of at least five minutes, with the higher the cadmium sulfide concentration in the phosphor, the lower the baking temperature and the longer the baking time. Preferably the iodine vapor baking temperature is from 550° C. to 650° C. for a period of at least twenty minutes.

In preparing the phosphor with the non-volatile co-activator, it is preferred first to prepare a hexagonal, copper-activated, zinc-cadmium sulfide phosphor which is photoluminescent, but which is either non-electroluminescent or very poorly electroluminescent. The initial firing temperature used to prepare the photoluminescent material is at least about 800° C., conducted in a sulfurizing atmosphere for a sufficient period of time to react the raw mix to form a substantially hexagonal crystalline structure. There is no real upper limit to the initial firing temperature, although the phosphor may become excessively hard or even sublime with extremely high firing temperatures and this should be avoided. Preferably the prefired material is crushed to powder form before baking in iodine vapor.

When the cubic structure is achieved in the baked phosphor, the maintenance of initial light output may be impaired if excess iodine is not removed. This is readily accomplished by heating the phosphor to a temperature of from 500° C. to 750° C. for a period of at least five minutes in an iodine-vapor free atmosphere, with the higher the cadmium sulfide concentration in the phosphor, the lower the temperature of this iodine-free atmosphere and the longer the heating time. Preferably this latter heating is conducted at a temperature of from 550° C. to 650° C. for a period of at least twenty minutes. Following are specific examples for preparing such cubic phosphors:

EXAMPLE I 83 grams of zinc sulfide are mixed with 21.7 grams of cadmium sulfide (molar ratio 85:15), 1.2 grams of copper acetate (equal to 0.006 gram atom of copper per gram mole of sulfide), and 3.4 gram of aluminum sulfate (equal to 0.01 gram atom of aluminum per gram mole of sulfide). These materials are intimately mixed by ball milling and then fired in an open silica boat in a sulfurizing atmosphere, such as is obtained by a stream of hydrogen sulfide. The firing temperature is 1,000° C. and the firing time is 1 hour. The resulting material is yellow-green under ultraviolet excitation and the matrix sulfide is hexagonal and not electroluminescent. The first-fired material is then crushed to a powder, mixed with one gram of purified elemental iodine, put into a capped silica tube, and fired at 620° C. for one hour with an atmosphere of static nitrogen surrounding the firing tube. The baked phosphor is then rapidly cooled, placed into an open silica boat, and heated at a temperature of 620° C. for one hour in a stream of hydrogen or a mixture of hydrogen and nitrogen for example. Thereafter the phosphor is cooled, washed in a cyanide solution as specified hereinbefore, and is ready for use. The emission color is a lemon-yellow under 60 c.p.s. excitation and somewhat more greenish-yellow at higher excitation frequencies. Its brightness and quantum efficiency are equivalent to that of a good, green, zinc sulfide which is activated by copper and coactivated by chlorine. The aluminum can be replaced by scandium with about the same results.

EXAMPLE II

The amount of copper in the mix given in Example I is replaced by 0.01 gram atom of copper, added as the acetate, per gram mole of total sulfide. The aluminum as specified in Example I is replaced by 0.001 gram atom of gallium per gram mole of total sulfide, with the gallium added as the nitrate. Two grams of elemental sulfur are also added to the mix and it is placed into a capped silica tube with a protective atmosphere of nitrogen and fired at a temperature of 1100° C. for fifteen minutes. This comprises the first firing step and further processing is identical to that as given under Example I. The resulting phosphor has an orange-yellow electroluminescent emission at 60 c.p.s. excitation, similar to that of a zinc sulfide activated by copper and manganese, but the electroluminescent emission is approximately twice as bright as that of a zinc sulfide, copper- and manganese-activated phosphor.

EXAMPLE III

Zinc sulfide and cadmium sulfide are mixed in the molar proportions of 82:18 along with 0.015 gram atom of copper (added as the acetate) and a small amount of purified sulfur. Gallium is added in amount of 0.002 gram atom per gram mole of total sulfide, with the gallium added as the nitrate. The mixture is placed in a capped silica tube, surrounded with the nitrogen protective atmosphere, and fired at 1,000° C. for 30 minutes. The remaining processing is similar to that as specified under Example I, except that the temperature of the iodine-vapor atmosphere is 550° C. The resulting phosphor emits in the orange-red at an excitation frequency of 60 c.p.s. and orange with an excitation frequency of about five k.c.p.s. Its brightness is excellent.

EXAMPLE IV

The orange-yellow emitting phosphor as specified under Example II is blended with a blue-green emitting zinc sulfide activated by copper and coactivated by chlorine, such latter phosphor being well known. By adjusting the ratios of the two phosphors in the blend, a white electroluminescent emission can be obtained, which emission is brighter than that heretofore obtained through the use of a blend of blue-green emitting phosphor and an orange-yellow emitting, zinc sulfide, copper and manganese-activated phosphor. In addition, the cubic zinc-cadmium sulfide, copper-activated phosphors of the present invention change emission colors with frequency and temperature in the same fashion as the zinc sulfide, copper-activated, chlorine-coactivated phosphors, with the result that for normal operating conditions, the blend normally remains substantially the same color, whatever the excitation frequency.

For best results in preparing any of the phosphors of the present invention, copper should initially be included in the raw mix with the phosphor in amount of from 0.002 to 0.03 gram atom per gram mole of total zinc and cadmium sulfides. The volatile coactivators such as bromine, chlorine and iodine are preferably introduced into the phosphor raw mix in amount of from 0.002 to 0.015 gram atom per gram mole of total zinc and cadmium sulfides. In the case of the non-volatile coactivators, the gallium is preferably introduced into the phosphor, either as a finely divided metal or as a compound, in amount of from $10^{-6}$ to $10^{-2}$ gram atom per gram mole of total zinc and cadmium sulfides. The aluminum and scandium are preferably introduced into the raw mix, either as finely divided metal or compound, in amount of from $10^{-6}$ to $10^{-1}$ gram atom per mole of total sulfide.

IODINE VAPOR BAKE OF CUBIC ZnCdS:Cu PHOSPHOR

In copending application Serial No. 166,027, filed concurrently herewith, titled "Cubic Zinc-Cadmium Sulfide Electroluminescent Phosphor and Method," and owned by the present assignee, is described a phosphor having a good output in the bluish-green to yellow regions of the visible spectrum. Briefly, this phosphor can be described as a cooper-activated, zinc-cadmium sulfide having a substantially cubic crystalline structure, wherein the molar ratio of ZnS:CdS in the phosphor is from about 92:8 to about 85:15. In preparing this phosphor, copper is included in compound form in the raw mix in an amount of from 0.002 to 0.03 gram atom per gram mole of zinc-cadmium sulfide. Bromine or bromine plus iodine coactivator is introduced into the raw mix for the phosphor in amount of from 0.0002 to 0.015 gram atom per gram mole of zinc-cadmium sulfide and there should be at least one gram atom of bromine introduced into the phosphor raw mix per 9 gram atoms of iodine. The preferred gram atom ratio of bromine to iodine is approximately 1:1. The phosphor is prepared by firing the raw mix constituents in an oxygen-free, sulfurizing atmosphere at a temperature of from 600° C. to 750° C. for at least two hours, with the greater the cadmium sulfide concentration in the phosphor, the lower the firing temperature and the longer the firing time, in order to insure that the cubic crystalline structure is obtained.

Particularly when the zinc sulfide to cadmium sulfide molar ratio in this phosphor is relatively high, such as from about 89:11 to 85:15, the phosphor particles tend to be overly fine and the average particle diameter can be as small as from 1 to 2 microns. This is too small for best electroluminescent response. Also, under some conditions of preparation, the particles in this phosphor tend to be overly fine even when somewhat lower cadmium sulfide concentrations are used.

In accordance with the present invention, such cubic zinc-cadmium sulfide phosphor can be further processed by baking in an atmosphere consisting essentially of iodine vapor at a temperature of from 500° C. to 750° C. for a period of at least five minutes, with the higher the relative cadmium sulfide concentration in the phosphor, the lower the baking temperature and the longer the baking time, in order to preserve the cubic crystalline structure. Preferably the phosphor is baked in the iodine vapor atmosphere at a temperature of from 550° C. to 650° C. for a period of at least 20 minutes. Such an iodine-vapor bake can also be used to increase the particle size of any copper-activated, zinc-cadmium sulfide electroluminescent phosphor having a cubic crystalline structure, a ZnS to CdS molar ratio of from about 92:8 to about 85:15 and coactivated by bromine, iodine, or chloride, or any mixture of these halogen coactivators. The preferred coactivator, however, is bromine or a mixture of bromine and iodine, as specified hereinbefore. Such an iodine-vapor bake is particularly effective when the molar ratio of ZnS to CdS is from about 89:11 to 85:15, since such phosphor as initially prepared will normally have a very small average particle size.

Following is a specific example for preparing such phosphor. Zinc sulfide and cadmium sulfide are mixed in the molar ratio of 85 molar percent zinc sulfide and 15 molar percent cadmium sulfide, along with one mole percent copper, added as $Cu(C_2H_3O_2)_2 \cdot 5\ H_2O$, and 0.3 gram atom percent of bromine added as zinc bromide. A small amount of elemental sulfur is also added to the raw mix in order to provide a sulfurizing atmosphere. The amounts of activator and coactivator, as specified, are calculated with respect to the total moles of zinc and cadmium sulfides in the raw mix. The raw mix is fired in a capped silica tube with a nitrogen protective atmosphere at a temperature of 600° C. for a period of one hour. Normally a somewhat longer firing time is required for such a phosphor, but with the supplemental bake in iodine vapor, the initial firing time can be shortened. This first-fired phosphor material has a cubic crystalline structure. The phosphor is cooled, crushed, and a small amount of elemental iodine is added to the raw mix and the phosphor refired, as in the initial step, but for a period of two hours. The phosphor is then cooled, crushed, and fired in an iodine-vapor-free atmosphere, such as a stream of nitrogen, at a temperature of 600° C. for a period of one hour. Thereafter the fired material is cooled, crushed, and cyanide washed to remove the excess cuprous sulfide. The emission color of the phosphor is yellowish under 60 c.p.s. excitation.

If the phosphor is prepared with an equivalent amount of chlorine coactivator to replace the bromine, the emission color is greenish yellow. The use of an equivalent amount of iodine to replace the bromine will shift the emission somewhat toward the shorter visible wavelengths. The specified coactivators can also be combined, if desired.

The supplemental iodine vapor bake will increase the particle size of the phosphor and thus improve the electroluminescence when the particles are initially overly small. As an example, a representative average particle size for a phosphor, prepared according to the immediately preceding specific example, is approximately 1 to 2 microns. After baking in the iodine vapor in the manner as specified, the average particle diameter of the phosphor will be in the order of 15 microns, with resulting greatly improved electroluminescent characteristics.

As in the case of the cubic ZnCdS:Cu phosphor which is converted from a hexagonal to a cubic crystalline structure by the present iodine-vapor bake, the cubic phosphor is preferably additionally heated to a temperature of from 550° C. to 750° C. for a period of at least five minutes in an iodine-vapor-free atmosphere, with the higher the cadmium sulfide concentration in the phosphor, the lower the temperature of this iodine-vapor-free atmosphere and the longer the heating time, in order to preserve the cubic structure in the phosphor. Preferably this latter heating is conducted at a temperature of from 550° C. to 650° C. for a period of at least 20 minutes.

There is disclosed in copending application Serial No. 58,979, now Patent No. 3,082,344, filed September 28, 1960, and owned by the present assignee, a supplemental baking technique wherein an electroluminescent phosphor is heated in an atmosphere comprising oxygen in order to improve its maintenance characteristics. With respect to the present phosphors which have been baked in the iodine-vapor atmosphere in such manner as to shift from a hexagonal to a cubic structure, or to retain a cubic structure, these phosphors can be baked in an atmosphere comprising oxygen at a temperature of from 500° C. to 750° C. for an extended period, with the baking temperature toward the lower end of this range when the cadmium sulfide concentration within the phosphor is relatively high, in order to insure that the processed material has a cubic crystalline structure. Such a supplemental baking technique makes it unnecessary to heat the cubic phosphor in the iodine-vapor-free atmosphere, as specified hereinbefore, in order to drive excess elemental iodine from the phosphor. Thus the baking in the atmosphere comprising oxygen and the supplemental heating in the iodine-vapor-free atmosphere can be consolidated as one step.

It will be recognized that the objects of the invention have been achieved by providing a method for enhancing the electroluminescent performance of copper-activated, hexagonal or cubic zinc-cadmium sulfide electroluminescent phosphor. In addition, there has been provided a method for converting copper-activated, zinc-cadmium sulfide electroluminescent phosphors from a hexagonal to

I claim as my invention:

1. The method of enhancing the electroluminescence of phosphor having a charge-compensated, copper-activated matrix of substantially hexagonal crystalline structure and selected from a sulfide of the group consisting of cadmium sulfide and zinc-cadmium sulfide, and with the relative molar proportions of CdS/ZnS in said phosphor being at least about 8/92, which method comprises, baking said phosphor in an atmosphere consisting essentially of iodine vapor at a temperature of from 500° C. to 900° C. for a period of at least five minutes, with the lower the baking temperature within the foregoing range, the longer the baking time.

2. The method as specified in claim 1, wherein said phosphor after baking is immediately removed from contact with iodine vapor.

3. The method as specified in claim 2, wherein said phosphor is further processed by washing in a solution which is a good solvent for cuprous sulfide but which is not a good solvent for zinc and cadmium sulfides.

4. The method of enhancing the electroluminescence of phosphor having a charge-compensated, copper-activated matrix of substantially hexagonal crystalline structure and selected from a sulfide of the group consisting of cadmium sulfide and zinc-cadmium sulfide, and with the relative molar proportions of CdS/ZnS in said phosphor being at least about 8/92, which method comprises, baking said phosphor in an atmosphere consisting essentially of iodine vapor at a temperature of from 550° C. to 650° C. for a period of at least twenty minutes.

5. The method of changing the crystalline structure from hexagonal to cubic and improving the electroluminescent performance of charge-compensated copper-activated zinc-cadmium sulfide phosphor having a molar ratio of ZnS/CdS of from about 92:8 to about 80:20, which method comprises, baking said phosphor in an atmosphere consisting essentially of iodine vapor at a temperature of from 500° C. to 750° C. for a period of at least five minutes, with the greater the cadmium sulfide proportions in said phosphor the lower the baking temperature and the longer the baking time.

6. The method as specified in claim 5, wherein said phosphor after baking is immediately removed from contact with iodine vapor.

7. The method as specified in claim 5, wherein said phosphor after baking is heated to a temperature of from 500° C. to 750° C. for a period of at least five minutes in an iodine-vapor-free atmosphere with the greater the cadmium sulfide proportions within said phosphor, the lower the temperature of the iodine-vapor-free atmosphere and the longer the heating time.

8. The method as specified in claim 5, wherein said phosphor after baking is washed in a solution which is a good solvent for cuprous sulfide but which is not a good solvent for zinc and cadmium sulfides.

9. The method of changing the crystalline structure from hexagonal to cubic and improving the electroluminescent performance of copper-activated zinc-cadmium sulfide phosphor coactivated by at least one material of the group consisting of chlorine, bromine, iodine, aluminum, gallium, and scandium, and wherein the molar ratio of ZnS/CdS in said phosphor is from about 92/8 to about 80:20, which method comprises, baking said phosphor in an atmosphere consisting essentially of iodine vapor at a temperature of from 500° C. to 750° C. for a period of at least five minutes, with the greater the cadmium sulfide proportions within said phosphor, the lower the baking temperature and the longer the baking time.

10. The method of changing the crystalline structure from hexagonal to cubic and improving the electroluminescent performance of copper-activated zinc-cadmium sulfide phosphor coactivated by at least one material of the group consisting of chlorine, bromine, iodine, aluminum, gallium, and scandium, and wherein the molar ratio of ZnS/CdS in said phosphor is from about 92/8 to about 85:15, which method comprises, baking said phosphor in an atmosphere consisting essentially of iodine vapor at a temperature of from 550° C. to 650° C. for a period of at least twenty minutes.

11. The method of making copper-activated zinc-cadmium sulfide electroluminescent phosphor having a cubic crystalline structure and coactivated by gallium, which method comprises, mixing the following ingredients in the following stated proportions: zinc and cadmium sulfides in the ZnS/CdS molar ratio of from about 92:8 to about 80:20, copper in compound form in amount of from 0.002 to 0.03 gram atom of copper per gram mole of total zinc and cadmium sulfides, and gallium coactivator material included in the raw mix for said phosphor in amount of from $10^{-6}$ to $10^{-2}$ gram atom per gram mole of total zinc and cadmium sulfides; firing the raw mix in a sulfurizing atmosphere at a temperature of at least 800° C. for a sufficient period to react said raw mix to form a substantially hexagonal crystalline structure; and thereafter baking said initially fired raw mix in an atmosphere consisting essentially of iodine vapor at a temperature of from 500° C. to 750° C. for a period of at least five minutes, with the greater the cadmium sulfide proportions in said phosphor, the lower the temperature of the iodine vapor baking atmosphere and the longer the baking time.

12. The method as specified in claim 11, wherein said phosphor is additionally heated in an iodine-free atmosphere at a temperature of from 500° C. to 750° C. for at least five minutes, with the greater the cadmium sulfide proportions in said phosphor, the lower the temperature of the iodine-free atmosphere and the longer the heating time.

13. The method as specified in claim 11, wherein said phosphor after baking in iodine vapor is immediately removed from contact with iodine vapor.

14. The method as specified in claim 11, wherein said phosphor after initial firing is baked in an atmosphere consisting essentially of iodine vapor at a temperature of from 550° C. to 650° C. for a period of at least twenty minutes.

15. The method as specified in claim 14, wherein said phosphor is additionally heated in an iodine-free atmosphere at a temperature of from 550° C. to 650° C. for at least twenty minutes.

16. The method of making copper-activated zinc-cadmium sulfide electroluminescent phosphor having a cubic crystalline structure and coactivated by aluminum, which method comprises, mixing the following ingredients in the following stated proportions: zinc and cadmium sulfides in the ZnS/CdS molar ratio of from about 92:8 to about 80:20, copper in compound form in amount of from 0.002 to 0.03 gram atom of copper per gram mole of total zinc and cadmium sulfides, and aluminum coactivator material included in the raw mix for said phosphor in amount of from $10^{-6}$ to $10^{-1}$ gram atom per gram mole of total zinc and cadmium sulfides; firing the raw mix in a sulfurizing atmosphere at a temperature at least 800° C. for a sufficient period to react said raw mix to form a substantially hexagonal crystalline structure; and thereafter baking said initially fired raw mix in an atmosphere consisting essentially of iodine vapor at a temperature of from 500° C. to 750° C. for a period of at least five minutes, with the greater the cadmium sulfide proportions in said phosphor, the lower the temperature of the iodine atmosphere and the longer the baking time.

17. The method of making copper-activated zinc-cadmium sulfide electrolucinescent phosphor having a cubic crystalline structure and coactivated by scandium, which method comprises, mixing the following ingredients in the following stated proportions: zinc and cadmium sulfides in the ZnS/CdS molar ratio of from about 92:8 to about 80:20, copper in compound form in amount of from 0.002 to 0.03 gram atom of copper per gram mole of total zinc and cadmium sulfides, and scandium coactivator material included in the raw mix for said phosphor in amount of from $10^{-6}$ to $10^{-1}$ gram atom per gram mole of total zinc and cadmium sulfides; firing the raw mix in a sulfurizing atmosphere at a temperature of at least 800° C. for a sufficient period to react said raw mix to form a substantially hexagonal crystalline structure; and thereafter baking said initially fired raw mix in an atmosphere consisting essentially of iodine vapor at a temperature of from 500° C. to 750° C. for a period of at least five minutes, with the greater the cadmium sulfide proportions in said phosphor, the lower the temperature of the iodine vapor atmosphere and the longer the baking time.

18. The method of increasing the particle size of copper-activated zinc-cadmium sulfide electroluminescent phosphor having a cubic crystalline structure, a zinc sulfide to cadmium sulfide molar ratio of from about 92:8 to about 85:15, and said phosphor coactivated by at least one halogen of the group consisting of bromine, iodine and chlorine, which method comprises, baking said phosphor in an atmosphere consisting essentially of iodine vapor at a temperature of from 500° C. to 750° C. for a period of at least five minutes, with the greater the cadmium sulfide proportions in said phosphor, the lower the temperature of the iodine vapor and the longer the baking time.

19. The method of increasing the particle size of copper-activated zinc-cadmium sulfide electroluminescent phosphor having a cubic crystalline structure, a zinc sulfide to cadmium sulfide molar ratio of from about 89:11 to about 85:15, and said phosphor coactivated by at least one halogen of the group consisting of bromine, iodine and chlorine, which method comprises, baking said phosphor in an atmosphere consisting essentially of iodine vapor at a temperature of from 500° C. to 750° C. for a period of at least five minutes, with the greater the cadmium sulfide proportions in said phosphor, the lower the temperature of the iodine vapor and the longer the baking time.

20. The method as specified in claim 19, wherein said phosphor after baking is immediately removed from contact with hot iodine vapor.

21. The method as specified in claim 19, wherein said phosphor after baking is heated to a temperature of from 500° C. to 750° C. for a period of at least five minutes in an iodine-vapor-free atmosphere, with the greater the cadmium sulfide proportions in said phosphor, the lower the heating temperature and the longer the heating time.

22. The method of increasing the particle size of electroluminescence phosphor consisting essentially of copper-activated zinc-cadmium sulfide having a substantially cubic crystalline structure and coactivated by halogen of the group consisting of bromine and bromine plus iodine, a molar ratio of ZnS to CdS in said phosphor of from about 92:8 to about 85:15, copper having been included in the raw mix for said phosphor in compound form in amount from 0.002 to 0.03 gram atom per mole of zinc-cadmium sulfide, halogen of said group having been introduced into the raw mix for said phosphor in amount from 0.0002 to 0.015 gram atom per gram mole of zinc and cadmium sulfides, and the halogen of said group having been introduced into the raw mix for said phosphor in the relative proportion of at least one gram atom of bromine per nine gram atoms of iodine, which method comprises, baking said phosphor in an atmosphere consisting essentially of iodine vapor at a temperature of from 500° C. to 750° C. for a period of at least five minutes, with the greater the cadmium sulfide proportions in said phosphor, the lower the temperature of the iodine vapor and the longer the baking time.

23. The method as specified in claim 22 wherein said phosphor after baking is immediately removed from contact with iodine vapor.

24. The method as specified in claim 22 wherein said phosphor after baking is heated to a temperature of from 500° C. to 750° C. for a period of at least five minutes in an iodine-vapor-free atmosphere, with the greater the cadmium sulfide proportions within said phosphor, the lower the heating temperature and the longer the heating time.

References Cited in the file of this patent

UNITED STATES PATENTS

| 2,847,386 | Mazo et al. | Aug. 12, 1958 |
| 2,859,367 | Larach | Nov. 4, 1958 |

FOREIGN PATENTS

| 606,135 | Canada | Oct. 4, 1960 |
| 782,095 | Great Britain | Sept. 4, 1957 |